United States Patent [19]

Lenkman

[11] Patent Number: 4,671,713

[45] Date of Patent: Jun. 9, 1987

[54] WHEELCHAIR LOCKDOWN DEVICE

[75] Inventor: Thomas E. Lenkman, Ferguson, Mo.

[73] Assignee: Harold Lietz Enterprise, Inc., Florissant, Mo.

[21] Appl. No.: 731,164

[22] Filed: May 6, 1985

[51] Int. Cl.[4] .......................... B61D 3/18; B60P 3/06

[52] U.S. Cl. .......................................... 410/7; 410/51

[58] Field of Search ....................................... 410/2–4, 410/7, 12, 19, 21–23, 51, 96; 296/19, 65 R, 65 A; 280/242 WC, 289 WC; 248/500, 503, 503.1; 211/5

[56] References Cited

U.S. PATENT DOCUMENTS

| | | | |
|---|---|---|---|
| 1,603,309 | 10/1926 | Bennett | 296/19 |
| 2,948,509 | 8/1960 | Rounds et al. | 248/503 |
| 3,955,847 | 5/1976 | Schiowitz | 296/65 R |
| 4,257,644 | 3/1981 | Stephens | 296/65 R |
| 4,455,046 | 6/1984 | Linderoth | 410/3 X |
| 4,471,972 | 9/1984 | Young | 410/23 X |

FOREIGN PATENT DOCUMENTS

| | | | |
|---|---|---|---|
| 2827377 | 1/1980 | Fed. Rep. of Germany | 410/7 |
| 2452401 | 11/1980 | France | 410/51 |
| 2480207 | 10/1981 | France | 248/503.1 |

*Primary Examiner*—Randolph A. Reese

*Attorney, Agent, or Firm*—Haverstock, Garrett & Roberts

[57] ABSTRACT

A device for locking down a wheelchair or like device having a wheel supported frame structure to a support structure having a fixed eyelet mounted thereon. The lockdown device includes an elongated assembly adjustable as to length and with spaced surfaces thereon for engaging and embracing spaced frame members on a wheelchair, and apparatus for applying force on the elongated assembly when engaged with wheelchair frame members to lock the wheelchair to the support structure. The apparatus is mounted transversely with respect to the elongated assembly and includes a hook member extendible through the elongated assembly having a hook portion on one end for cooperatively engaging the fixed eyelet and a cam member pivotally mounted thereon for engaging a cam follower on the elongated member, the cam member being movable relative to the cam follower to change the extended position of the hook portion relative to the elongated assembly and to simultaneously exert force on the elongated assembly against the wheelchair frame members engaged therewith. The device also includes an adjustment member threadedly engageable with the hook member to adjust the position of the hook member relative to the elongated assembly.

11 Claims, 6 Drawing Figures

WHEELCHAIR LOCKDOWN DEVICE

BACKGROUND OF THE INVENTION

The present invention relates generally to means for securely locking a wheelchair or like device in place including during transportation thereof within a vehicle, and more particularly to a wheelchair lockdown device that engages the lower frame members of the wheelchair and includes an easily operated mechanism to secure the wheelchair to a fixed member such as to a member attached to the vehicle floor to prevent movements of the wheelchair when anchored.

DESCRIPTION OF THE RELATED ART

Existing hold-down devices for wheelchairs and the like are typically complex and difficult to operate, and their use frequently causes discomfort for a wheelchair occupant especially during transport in a vehicle. The hold-down devices disclosed in the prior art have often also required substantial modifications to the wheelchair or the transporting vehicle, or to both, before the devices can be used. The known hold-down devices have usually also required the help of an assistant to secure a wneelchair in a transporting vehicle, and this is because the complexity of the known devices has prevented the occupant from securing his own wheelchair.

Handicapped persons who are restricted to travelling in wheelchairs often suffer discomfort and anxiety when using prior known hold-down devices, and this is especially true of prior devices that have straps that must be attached and which extend across the lap or shoulders of the wheelchair occupant and secure the wheelchair in place. Such strap-type hold-down devices almost always allow the wheelchair some limited freedom to bounce or move about as when a vehicle is in motion since the straps that secure the wheelchair also press against the wheelchair occupant, and must be kept loose enough to keep the occupant relatively comfortable. A loose strap can also create an uncomfortable ride for the handicapped person since the occupant can be rather violently "thrown" against the restraining straps as the wheelchair bounces and this is especially a problem during acceleration and deceleration and during sudden stops and in collisions. Persons who have the physical capability to drive but who are restricted to being in wheelchairs often are precluded from driving because their wheelchair cannot be sufficiently secured using strap-type devices to permit such persons to maintain control over the vehicle under all circumstances. This can restrict the freedom of handicapped persons and can make them feel helpless since they are then unable to drive. Relying on others to secure their wheelchairs can also cause handicapped persons to lose dignity and self-esteem.

One example of a strap-type hold-down device is a tie-down assembly which includes a seatbelt that is placed across the lap of a wheelchair-bound person and which is engaged at both ends thereof to locking means mounted to a side wall or other location in the vehicle. Engaging the seatbelt with the locking means tightens the belt against the handicapped person and causes discomfort while leaving the belt loose may relieve the person to some extent, but it also permits the wheelchair to move about while the van is in motion. Such hold-down devices, because of their deficiencies, prevent a handicapped person from adequately securing his own wheelchair and may prevent him or her from driving while seated in a wheelchair.

The hold-down devices disclosed in U.S. Pat. Nos. 4,060,271; 4,257,644; and 4,492,403, teach constructions of tie-down assemblies that require a plurality of straps, belts, or chains to be attached to the frame of the wheelchair and then secured by locking means to a vehicle floor. To secure ones own wheelchair using such a device the handicapped person has to lean far over the side frame of his wheelchair and risks falling out of the wheelchair. The threat of injury from such activity, and the fear that the handicapped person will be unable to return to his wheelchair, are a significant deterents to using such devices and almost inevitably leads to the requirement of an assistant to help the handicapped person secure the hold-down device. The freedom of a wheelchair-bound person to travel under these circumstances is therefore limited since he must have an assistant present, and he is usually prevented from driving while seated in his wheelchair since the tie-down straps employed allow too much "give" or slack to adequately hold the wheelchair. This slack can allow the wheelchair to move about and can create a dangerous situation since sudden jolts, such as those caused when a vehicle hits a pothole or bumps in the road, or suddenly brakes, can cause the wheelchair to move and the handicapped person to lose control of the vehicle.

Other prior art hold-down devices include other means to lock the wheelchair to structures mounted to the vehicle floor, and one such device is shown in U.S. Pat. No. 4,457,551. This hold-down structure requires that a channel bracket having a locking pin pivotally mounted thereto be added to the frame of the wheelchair and that means be provided for locking the device to the floor of the vehicle. With this device, the wheelchair is manuevered so that the channel bracket receives the locking structure therein, and the wheelchair is then secured by pivoting the locking pin into mated engagement with the locking structure. This is a difficult task and also requires modifying the wheelchair itself.

The hold-down devices shown in U.S. Pat. Nos. 4,455,046 and 4,076,268 also require that structures be added to the wheelchair frame and that locking elements be mounted to the vehicle floor. With these devices, the wheelchair must first be accurately positioned with respect to the locking elements to secure the wheelchair, and this can require a substantial amount of manuevering. Operating these hold-down assemblies to secure a wheelchair is a tricky business, especially if the person in the wheelchair tries to do it, and it can place the wheelchair occupant in danger of falling out of the wheelchair. It is therefore usually necessary to have assistance to secure the wheelchair using these hold-down assemblies, and this limits the freedom of the handicapped person. Although these hold-down devices might enable a wheelchair-bound person to drive, this advantage is partly offset if an assistant is required to secure and later loosen the wheelchair.

A still other type of hold-down assembly is shown in U.S. Pat. No. 3,955,847 and the device disclosed includes an elongated bar member which is part of the assembly and is positioned to simply rest on and thereafter bear down on spaced lower horizontal frame members of a wheelchair. A stud member extends vertically through a central opening in the elongated bar member and has a lower hook portion that engages an eye element in the floor of the vehicle and an upwardly extending threaded portion. A wing nut or other like nut member is threaded onto the threaded upper portion of the stud member and when tightened sufficiently bears against the bar member to press the bar member against the frame members on the wheelchair to secure the wheelchair in place. This device, however, permits the wheelchair to "rock" or move laterally relative to the bar member when the vehicle undergoes sudden movements and in the extreme the bar member might slide off the frame members and this would be very undesirable. It is also possible that the jiggling movments of the vehicle might cause the threaded nut to work loose with the resulting danger that the hold-down device will become disengaged from the wheelchair as a result thereof and this can be a major problem. The patentee of this prior art device recognized some of these possibilities and to overcome them suggested the possible need to substantially modify the contour of the vehicle floor on which the wheels of the wheelchair rest when it is made secure to deter movement thereof. The proposed modifications include removing sections of the floor of the vehicle and replacing the removed sections with curve shaped troughs to accommodate the wheels of the wheelchair. The troughs are made to receive the main wheels of the wheelchair and are designed to restrict movement of the wheelchair when positioned therein. Even with these changes, which are costly and substantial, it is expected that it will be very difficult, and time consuming, even if it is possible for the wheelchair occupant acting alone to move his wheelchair into and out of the troughs and to install or loosen this hold-down assembly especially since the wing nut requires a significant amount of tightening to secure the wheelchair and this must be done while the cross bar is merely resting on the frame members and can move even while being tightened. Also, the wheelchair occupant would have to lean far over the side of his wheelchair to take hold of and turn the wing nut. Furthermore, by having special troughs for the wheelchair wheels to be in means that the wheelchair may be difficult to move out of the grooves when it is time to leave the vehicle. None of these difficulties and disadvantages are present when using the present wheelchair lockdown device.

SUMMARY OF THE INVENTION

The present invention resides in a lockdown device that can be used to easily and quickly secure a wheelchair to a fixed member such as to a floor of a transporting vehicle such as a van or other type of vehicle, and it includes a novel extendible bar assembly which has portions that are able to engage and embrace and bear against the frame members of a wheelchair when the wheelchair is secured in place.

The extendible bar assembly can be adjusted to accommodate wheelchairs having different spacing widths between their lower frame members, and the construction of the extendible bar assembly is such that it reduces the need to precisely manuever and locate the wheelchair into position to secure it in place. For example, the wheelchair need only be manuevered to a position generally centered over an eyelet element secured to the floor to which the wheelchair is to be secured, and the position of the wheelchair engaging portions of the extendible bar assembly are adjusted so that the way they engage the wheelchair frame members prevents relative movement therebetween when being tightened or loosened. The wheelchair engaging portions of the extendible bar assembly are shaped to embrace portions of the frame members, so that the embraced frame members and the wheelchair of which they are part can not move relative to the vehicle when clamped in locked position. The frame embracing portions when clamped to the frame members also prevent the wheelchair from shifting and overturning as during a collision, a sudden change of vehicle speed, and during periods of acceleration and deceleration. This is extremely important to the safety of the occupant of the wheelchair.

The locking means of the present invention represents a substantial improvement over prior art devices used for the same or similar purposes. The locking means include cam, cam follower, and cam moving means which are located in a vertical assembly attached at an intermediate location to the extendible bar assembly. When the cam moving means are operated, they cause the frame embracing portions of the extendible bar assembly to bear down on the frame members of the wheelchair to clamp and lock the frame embracing portions in a fixed position thereon. The cam moving means include a handle member that is attached to the cam means and movable between an unlocked position in which the extendible bar assembly is loose on the frame members and can either be installed thereon or removed therefrom, and a locked position in which the embracing portions of the extendible bar assembly bear down on and lock the frame members in position. The cam means are located in the vertical assembly which has a hook on one end for engaging a fixed anchor member or eyelet in the floor and adjustment means on the opposite end. Operation of the cam moving means causes the cam means to move against the cam follower located on the bar assembly to change the distance between the extendible bar assembly and the fixed anchor or eyelet. The construction of the cam means is such that in the locked position thereof they cannot change position or therefore come loose. The vertical assembly also includes means adjustable to establish the effective range of the cam means.

The ease of operation of the present device, which requires the simple movement of the handle member to lock and to unlock it, permits a wheelchair occupant or some other person to secure a wheelchair to a fixed structure such as the floor of a vehicle or to loosen it therefrom with minimal risk of the wheelchair overturning or coming loose from its moorings during the process. The present means therefore provide a secure anchor for a wheelchair, with no change to or modification of the wheelchair and with relatively little change or modification of the vehicle, and in so doing the present device gives a wheelchair occupant greater freedom to manage his or her life.

Also, the present device permits greater flexibility than known devices in locating and mounting the anchor member, and therefore the wheelchair taking into account the vehicle involved and the size and type of wheelchair to be locked down. The greater flexibility in locating the anchor member and the greater ease with which a wheelchair can be anchored are important to nursing homes, hospital staffs and other places which handle the transporting of wheelchairs in vehicles. This is true whether one or several wheelchairs are to be transported in the same vehicle.

As an additional safety measure, a regular seatbelt such as those commonly available in vehicles can be used to prevent the handicapped person from falling or being thrown from his wheelchair. Since the wheelchair is securely retained in place, the wheelchair occupant will suffer no greater discomfort using the seatbelt than would a non-handicapped person who uses a seatbelt while seated in a regular vehicle seat.

It is therefore a principal object of the present invention to teach the construction and operation of a wheelchair lockdown device that is easy and quick to use to secure a wheelchair in a stationary position.

Another object is to provide a wheelchair lockdown device that is easier for a wheelchair occupant to operate to secure his wheelchair and thereby permits such persons greater freedom of movement including in vehicles.

Another object is to provide a wheelchair lockdown device that is relatively less effected by vehicle movements and vibrations.

Another object is to teach the construction and operation of a relatively simple and inexpensive means for securely locking down a wheelchair in a motor vehicle.

Another object is to make it safer to transport handicapped persons in wheelchairs in vehicles.

Another object is to provide a wheelchair lockdown device that does not require as precise positioning of a wheelchair in a vehicle in order to lock it in position.

Another object is to provide a wheelchair lockdown device that can be adjusted to accommodate a wide range of wheelchair sizes and styles.

Another object is to provide a wheelchair lockdown device having locking means which can be quickly and easily engaged and disengaged.

Another object is to provide a wheelchair lockdown device that can be operated from the front or from the rear of a wheelchair.

Another object is to provide a lockdown device that is relatively inexpensive to construct, is relatively compact for ease of storage and is extremely simple to operate.

These and other objects and advantages of the present invention will become apparent to those skilled in the art after considering the following detailed specification of a preferred embodiment of the present wheelchair lockdown device in conjunction with the accompanying drawings, wherein:

DESCRIPTION OF THE PREFERRED EMBODIMENT

The present lockdown device 10 is constructed to cooperate with the frame portion of a wheelchair such as wheelchair A to lock the wheelchair in position on a surface such as on the floor or bed of a vehicle. The construction of the present device is such that it can be adjusted to accommodate wheelchairs of different sizes, styles, and constructions as will be explained, and the present construction is designed to be able to lock the wheelchair in place by a simple movement in one direction of a hand crank. The same hand crank can thereafter be used to loosen the locking device 10 so that the wheelchair A can be removed from the vehicle including from its locked-down condition. The subject lockdown device 10 can also be used to lockdown a wheelchair on any fixed support or floor to prevent it from moving.

Figure 1:
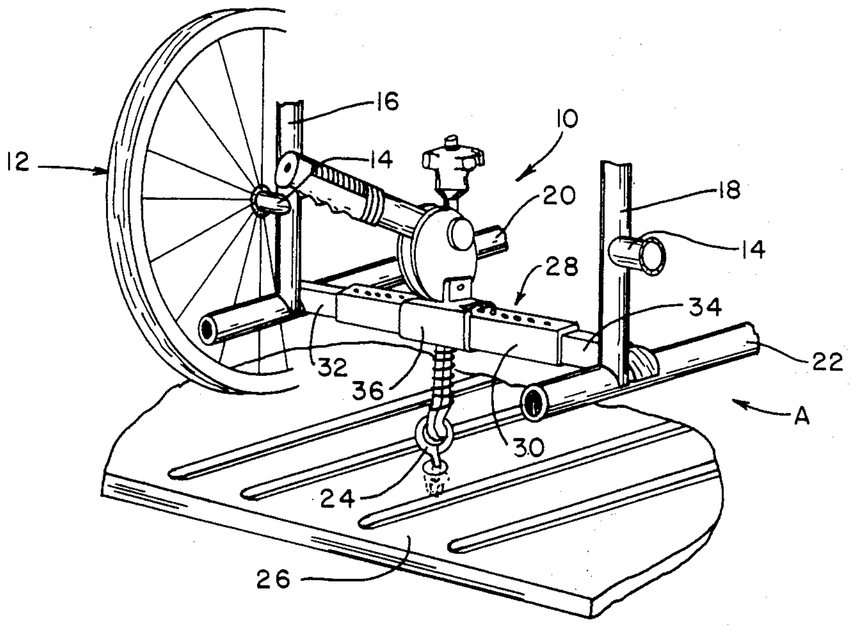
FIG. 1 is a fragmentary perspective view showing a portion of wheelchair being secured to a floor of a vehicle by wheelchair lockdown means constructed according to the present invention.

Referring to FIG. 1 of the drawings, the wheelchair A is shown having wheels, such as wheel 12 (only one being shown), supported on axles 14 which in turn are connected to posts 16 and 18 and to other structural members including spaced frame members 20 and 22. Many conventional wheelchairs have constructions that include such. The present lockdown device 10 is designed to engage the frame members 20 and 22 and to also engage means such as anchor or fixed eyelet 24 fixedly attached to the floor 26 of a vehicle or other device.

Figure 2:
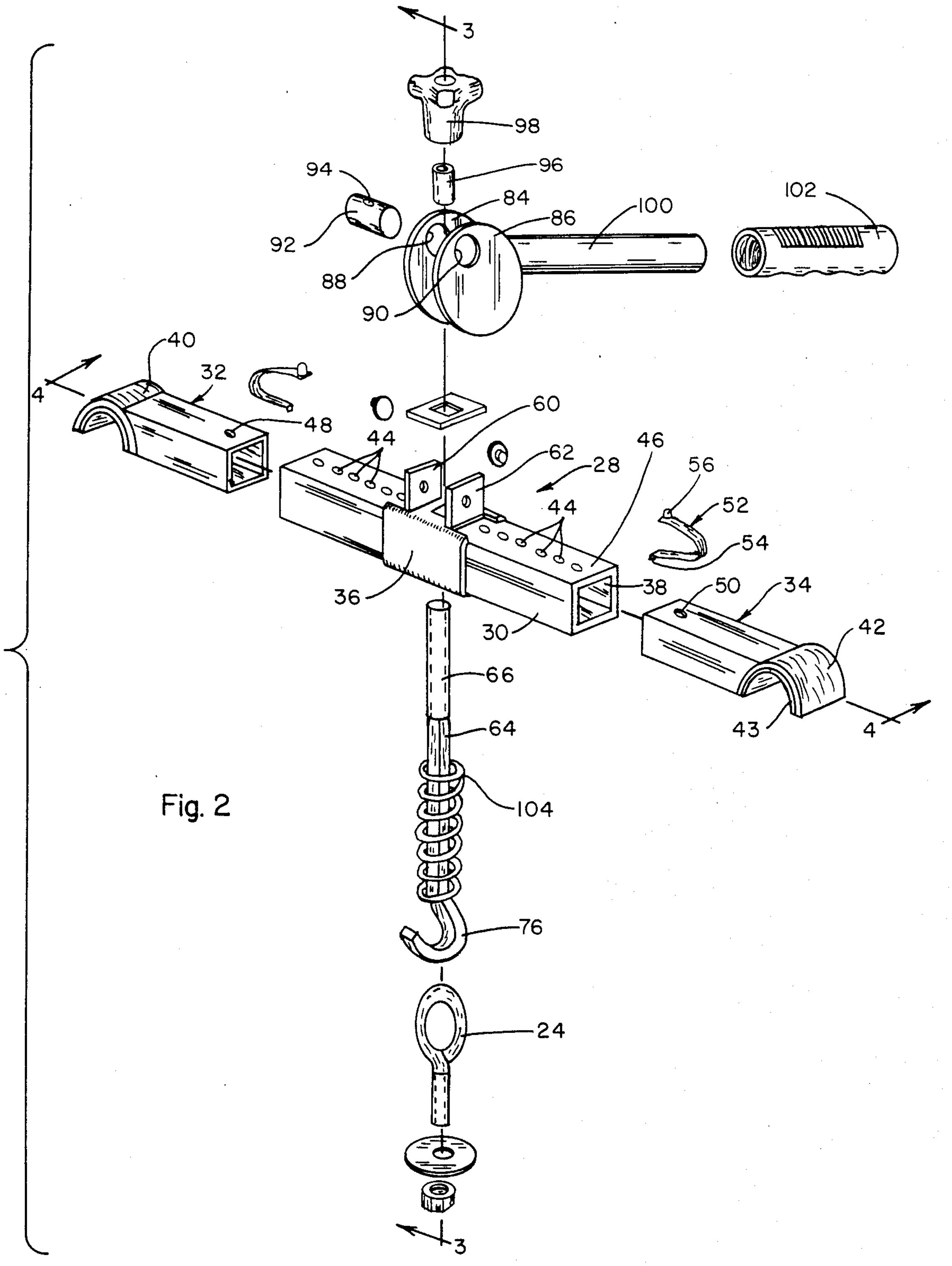
FIG. 2 is an enlarged exploded view of the present wheelchair lockdown device.

The device 10 includes a cross arm assembly 28 which is shown including a central portion 30 and two spaced end portions 32 and 34. The central portion 30 extends through a shorter outer central tubular member 36. The details of the cross arm assembly 28 are shown more specifically in the exploded view of FIG. 2 wherein the member 30 is shown of square shaped tubular cross-section defining a square shaped passageway 38 extending therethrough. The end portions 32 and 34 are also square shaped tubular members and are sized to be slidably received within the passage 38 in the member 30, and each of the members 32 and 34 has attached to one end thereof a respective one of the downwardly opening curved wall portions 40 and 42 which is sized and shaped to engage and embrace the respective spaced frame members 20 and 22 on the wheelchair when the device 10 is engaged therewith. The inner concave surfaces of the members 40 and 42 can be coated or covered with a layer of a cushion material 43 to prevent scratching the frame members 20 and 22 when engaged therewith and also to prevent slippage therebetween. The cushion material 43 will also reduce noise and vibration between the members.

The member 30 has a plurality of spaced openings 44 located in its upper wall 46, and the end portions 32 and 34 are each shown having a single opening 48 or 50 formed in their respective upper wall. The openings 48 and 50 are located to register with selected ones of the openings 44 in the respective ends of the central portion 30 when the end portions 32 and 34 are positioned extending therein. Each of the end portions 32 and 34 also has mounted in it a resilient C-shaped spring member such as the spring member 52 which spring members have respective sidewardly extending end projection 54 for engaging an inner surface of the member 32 or 34, and each spring 52 has an outwardly extending button 56 which resiliently extends through the respective opening 48 or 50 in the end portions 32 and 34. The buttons 56 are long enough to also extend into the selected aligned openings 44 in the wall 46 of the member 30 to lock the members 32 and 34 in predetermined extended positions relative to the member 30. The purpose of this feature is to enable the space between the curved wall members 40 and 42 on the respective end members 32 and 34 to be adjustable so that they can accommodate the distance between the frame members 20 and 22 on the particular wheelchair which are to be engaged thereby. When properly adjusted the members 40 and 42 should engage and embrace the respective frame members 20 and 22 as clearly shown in FIG. 1.

Tne central tubular member 30 (FIGS. 3 and 4) also has an opening shown as opening 58 adjacent to the center of the upper wall 46 thereof and the outer tubular member 36 also has a centrally located square opening 59 which registers with the opening 58. The outer tubular member 36 has a pair of spaced upwardly extending flanges 60 and 62 located in spaced relation on opposite sides of the opening 59. The purpose for the flanges 60 and 62 will become apparent hereinafter.

The lockdown device 10 includes a vertically extending portion or assembly which includes a vertically extending rod member 64 which has a threaded upper end portion 66 that is positioned extending up through openings 68 and 70 in lower walls 72 and 74 of the tubular members 30 and 36, respectively (FIG. 4), and through the openings 58 and 59 which register therewith. The rod shaped member 64 has a hook 76 formed on its lower end and is constructed to engage the anchor eyelet 24 when the subject device is being used to lock down a wheelchair.

The upper threaded end portion 66 of the rod 64 extends through the openings 68, 70, 58, and 59 and through another opening 78 formed in a washer member 80 which is positioned engaging the upper wall 82 of the outer tubular member 36. The washer 80 serves as a cam follower and extends between the upwardly extending flanges 60 and 62 to form a bearing surface against which spaced cam members 84 and 86 are engaged. The cams 84 and 86 have aligned eccentrically located openings 88 and 90 which accommodate a journal member 92 that has an opening 94 therethrough that receives the threaded upper end portion 66 of the rod 64. The threaded upper end of the rod 64 also extends through a tubular washer 96 and is threadedly engaged with an adjustment knob 98. The purpose of the knob 98 is to adjust the position of the rod 64 relative to the cross arm assembly 28 which in turn adjusts the position of the hook portion 76 as will be explained.

The cams 84 and 86 are fixedly connected to each other by means of handle member 100 which may be welded or otherwise fixedly attached therebetween. The handle 100 extends outwardly from between the cams 84 and 86 at a convenient angular orientation, and the handle is shown having a handle grip 102 mounted thereon.

Figure 3:
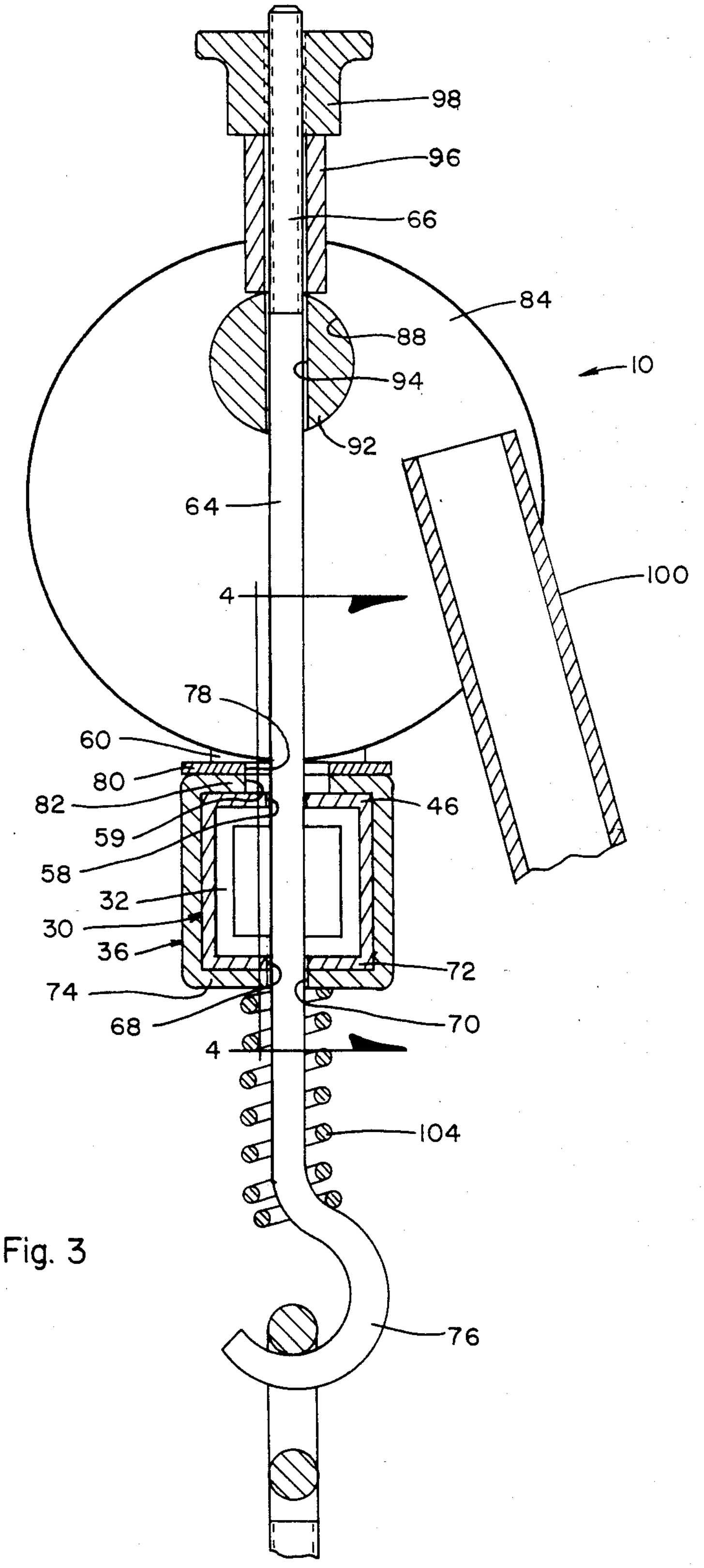
FIG. 3 is a further enlarged side elevational view partly in cross-section showing more of the details of the present wheelchair lockdown device.
Figure 4:
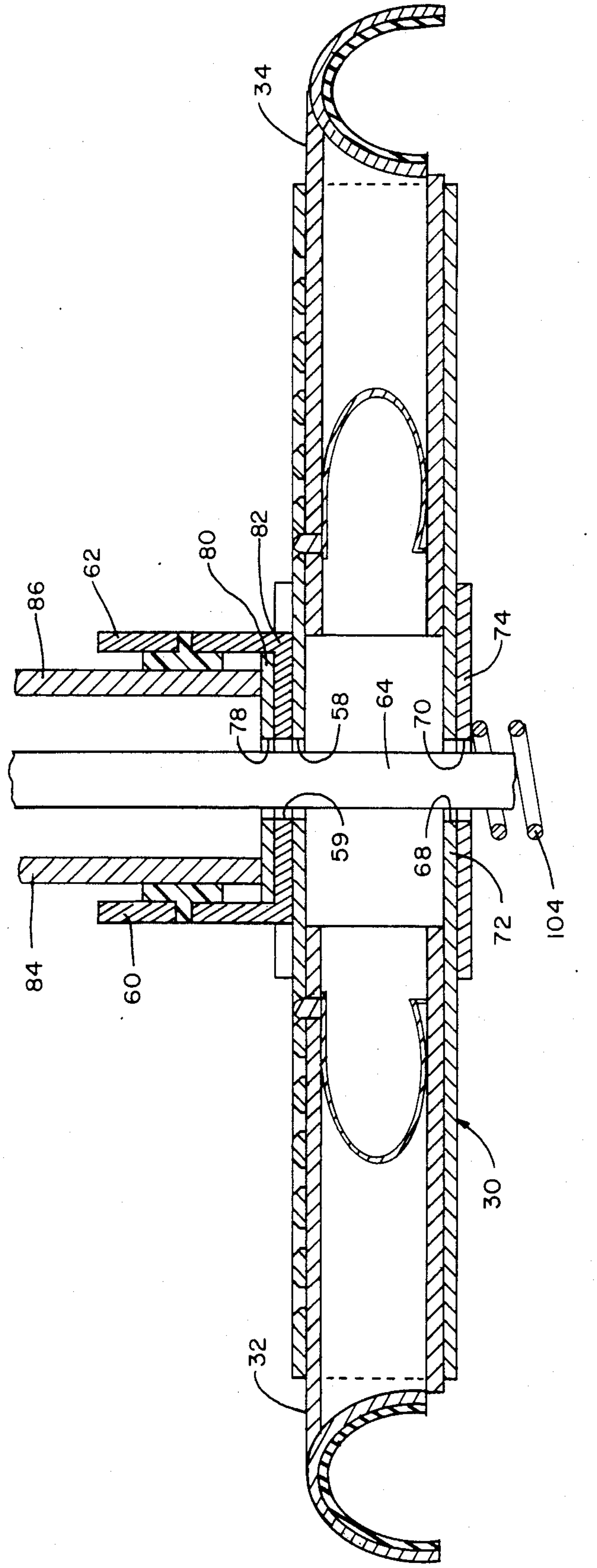
FIG. 4 is a cross-sectional view taken on line 4—4 of FIG. 3.
Figure 6:
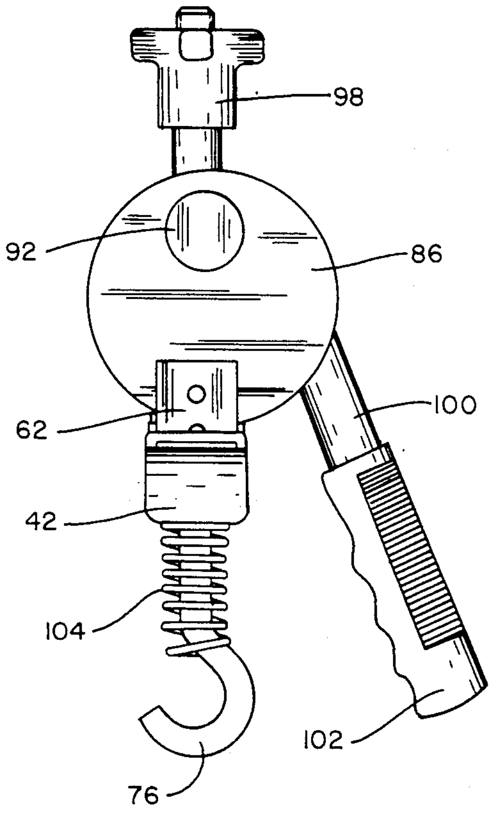
Figure 5:
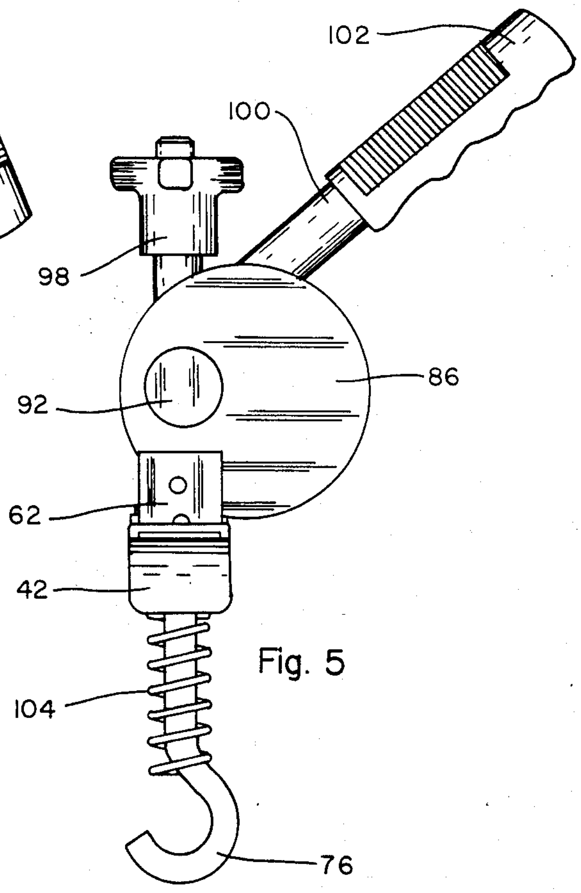
FIG. 5 is a side elevational view of the subject lockdown device shown in its unlocked position; and, FIG. 6 is a side elevational view of the same device shown in locked position.

When the device 10 is assembled as shown in FIGS. 1 and 5 if, for example, the handle 100 is in its upward or raised position the hook 76 will extend downwardly a substantial distance below the cross arm assembly 28 being urged into extended position by spring member 104. This makes it relatively easy to engage the hook 76 with the eyelet 24 while the members 40 and 42 are resting on the respective frame members 20 and 22. Thereafter, and when the knob 98 is properly adjusted, the handle 100 can be moved to its downward position (FIGS. 3 and 6) causing the cams 84 and 86 to move to positions centering their larger diameter portions against the upper cam follower surface of the washer 80. The action of the movement of the handle 100 takes place against the biasing action of the coil spring 104 which extends between the lower wall 74 of the member 36 and the hook portion 76 of the rod 64. The spring 104 also maintains the device under some tension so that it is easier to handle. In the lowered locked position with the handle 100 and the cams 84 and 86 positioned as shown in FIGS. 3 and 6, and the wheelchair A will be locked in position. In this postion there is little or no possibility of the device coming loose or vibrating unless the handle 100 is again moved to its raised position.

It is important to realize that the present device enables a wheelchair to be locked into fixed position in a vehicle or elsewhere with minimal manipulation of parts and with minimal effort by the person doing the locking or unlocking. Furthermore, when the present device is used it is not necessary to modify the surface or floor or other portions of the vehicle or other device on which the eyelet 24 is installed. For example, it is not necessary to modify the vehicle floor to provide wheel pockets or grooves and it is not necessary to thread any member in order to lock the device once the knob 98 is set. It is only necessary to move the handle 100, and this movement is easy to accomplish. Still further, because of the unique construction of the present device, it can be used to accommodate different sizes and constructions of wheelchairs and is not limited in this regard. This means that only one model of the present device need be stocked to accommodate many different wheelchair sizes and constructions and this in itself is an important advantage. It should also be apparent that the subject device can be installed to be operated from the rear and in some cases also from the front of a wheelchair.

Thus there has been shown and described a novel and non-obvious wheelchair lockdown device which fulfills all of the objects and advantages sought therefor. It will be apparent to those skilled in the art, however, after a review of this description, that many changes, modificatons, variations, and other uses and applications for the subject construction, in addition to those which have been disclosed, are possible and contemplated. All such changes, modifications, variations, and other uses and applications which do not depart from the spirit and scope of the invention are deemed to be covered by the invention which is limited only by the claims which follow.

What is claimed is:

1. A wheelchair lockdown device for securing a wheelchair or like device having horizontally spaced frame members to prevent movement thereof relative to a support structure having an eyelet fixedly mounted thereon, said lockdown device comprising an elongated bar assembly having spaced opposite end portions including channel shaped means for engaging and bearing on spaced frame members on a wheelchair to be locked down, means for locking said elongated bar assembly on said spaced frame members including a lockdown assembly having a portion positioned extending through the elongated bar assembly at an intermediate location therealong, said portion of the lockdown assembly having a hook portion on one end thereof for cooperatively engaging the fixed eyelet and an opposite end extending through the elongated bar assembly and from the side thereof opposite from the hook portion, said lockdown assembly including means engageable with the opposite end thereof operatively engageable with the elongated bar assembly and movable relative thereto between a first position in which the hook portion extends a predetermined distance from the elongated bar assembly and a second position in which the hook portion extends a distance less than the predetermined distance from the elongated bar assembly whereby the hook portion cooperates with the engaged eyelet to pull the elongated bar assembly into a locked down position on the spaced frame members, said means movable between the first and second positions including cam and cam follower means one portion of which is located on the lockdown assembly and the other on the elongated bar assembly and means threadedly mounted on the portion of the lockdown assembly that extends through the elongated bar assembly opposite from the hook member, said means being threadedly adjustable to change the space between the hook member and the elongated bar assembly.

2. The device of claim 1 wherein the means movable on the lockdown assembly includes a handle member attached to the cam means.

3. The device of claim 1 including yieldable means mounted on the portion of the lockdown assembly that extends through the elongated bar assembly in position extending between the elongated bar assembly and the hook portion, said yieldable means urging the hook portion of the lockdown assembly away from the elongated bar assembly.

4. The device of claim 1 wherein the channel shaped means engaging and bearing on the spaced frame members on a wheelchair include spaced members on the elongated bar assembly having concave frame engaging surfaces.

5. The device of claim 4 wherein the concave frame engaging surfaces are covered with a material that cushions engagement thereof with the frame members to reduce slippage therebetween.

6. The device of claim 1 wherein the elongated bar assembly includes a tubular member open at both opposite ends and having a central opening to accommodate the portion of the lockdown assembly that extends therethrough, and an extendible member positioned telescopically extending into each opposite end thereof, the channel shaped means engaging and bearing on the spaced frame members on a wheelchair being located respectively on said extendible members.

7. The device of claim 6 including means to lock at least one of said extendible members in fixed position in the tubular member.

8. The device of claim 1 wherein the cam means include a cam member mounted for rotation about an axis located to intersect the portion of the lockdown assembly that extends through the elongated bar assembly, said cam having a cam surface that is eccentric relative to the axis of rotation, the cam follower means including a surface on the elongated bar assembly in position to be engageable by the surface of the cam member.

9. Apparatus for locking down a wheelchair having spaced wheels and a frame structure including spaced frame members connected thereto comprising an elongated bar assembly having a spaced channel shaped means thereon for engaging and bearing on spaced frame members on the wheelchair, said bar assembly including means to adjust the space between the spaced means to accommodate the spacing of the frame members to be engaged thereby, means engageable transversely with the bar assembly intermediate between the spaced means thereon including an elongated hook member having a hook portion on one end and a stem portion extendable from the hook portion to and through the bar assembly and from the opposite side thereof, a cam member mounted for rotation about an axis that extends through the stem portion of the hook member on the opposite side of the bar assembly from the hook portion, said cam having a cam surface that is eccentric relative to the axis of rotation thereof, a cam follower surface on the bar assembly in position to be engaged by the cam surface of the cam member, yieldable means on the stem portion of the hook member between the bar assembly and the hook portion of the hook member in position to urge the hook portion away from the bar assembly and the cam surface of the cam member into engagement with the cam follower surface, and other means on the stem portion of the hook member adjustable thereon to control the position of the axis of rotation of the cam member thereon relative to the hook member.

10. The apparatus of claim 9 wherein the channel shaped means engaging and bearing on the spaced frame members on a wheelchair include spaced members on the elongated bar assembly having concave frame engaging surfaces.

11. The apparatus of claim 10 wherein the concave frame engaging surfaces are covered with a material that cushions engagement thereof with the frame members to reduce slippage therebetween.

* * * * *